United States Patent
Bonnier et al.

(10) Patent No.: US 9,313,668 B2
(45) Date of Patent: Apr. 12, 2016

(54) DYNAMIC PROVISIONING OF TWAMP

(71) Applicant: TELEFONAKTIEBOLAGET L M ERICSSON (PUBL), Stockholm (SE)

(72) Inventors: Staffan Bonnier, Askim (SE); Samita Chakrabarti, Sunnyvale, CA (US); Mahmood Hossain, Cupertino, CA (US)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 241 days.

(21) Appl. No.: 13/895,106

(22) Filed: May 15, 2013

(65) Prior Publication Data

US 2014/0226507 A1 Aug. 14, 2014

Related U.S. Application Data

(60) Provisional application No. 61/763,098, filed on Feb. 11, 2013.

(51) Int. Cl.
*H04W 4/00* (2009.01)
*H04W 24/00* (2009.01)
*H04L 12/26* (2006.01)

(52) U.S. Cl.
CPC .............. *H04W 24/00* (2013.01); *H04L 43/08* (2013.01); *H04L 43/106* (2013.01)

(58) Field of Classification Search
USPC ................................. 370/241, 252, 248, 395.5
See application file for complete search history.

(56) References Cited

U.S. PATENT DOCUMENTS

| | | | |
|---|---|---|---|
| 2008/0036586 A1* | 2/2008 | Ohki | 340/539.13 |
| 2010/0242096 A1* | 9/2010 | Varadharajan et al. | 726/4 |
| 2012/0087235 A1* | 4/2012 | Smith | H04L 41/0677 370/221 |
| 2012/0155324 A1* | 6/2012 | Janakiraman et al. | 370/254 |

FOREIGN PATENT DOCUMENTS

EP 2469761 A1 6/2012

OTHER PUBLICATIONS

Shalunov S. et al., "A One way Active Measurement Protocol (OWAMP)", RFC 4656, Sep. 1, 2006, chapter 1-4, pp. 2-33.
Hedayat K. et al., "A Two-Way Active Measurement Protocol (TWAHP)", RFC 5357, Internet Engineering Task Force, IETF; Standard, Internet Society (ISOC) 4, Rue Des Falaises CH-1285 Geneva, Switzerland, Oct. 1, 2008, chapter 1-4, pp. 2-20.

* cited by examiner

*Primary Examiner* — Zewdu A Beyen

(57) ABSTRACT

In exemplary embodiments in the present disclosure a method in a first Network Node for measuring network characteristics using a performance measuring protocol is defined. The method comprises receiving a message, extracting a network address of a second network node from said message, and storing said network address of said second network node. The method further comprises setting up a session for measuring network characteristics using said performance measuring protocol between said first network node and said second network node utilizing said network address.

6 Claims, 4 Drawing Sheets

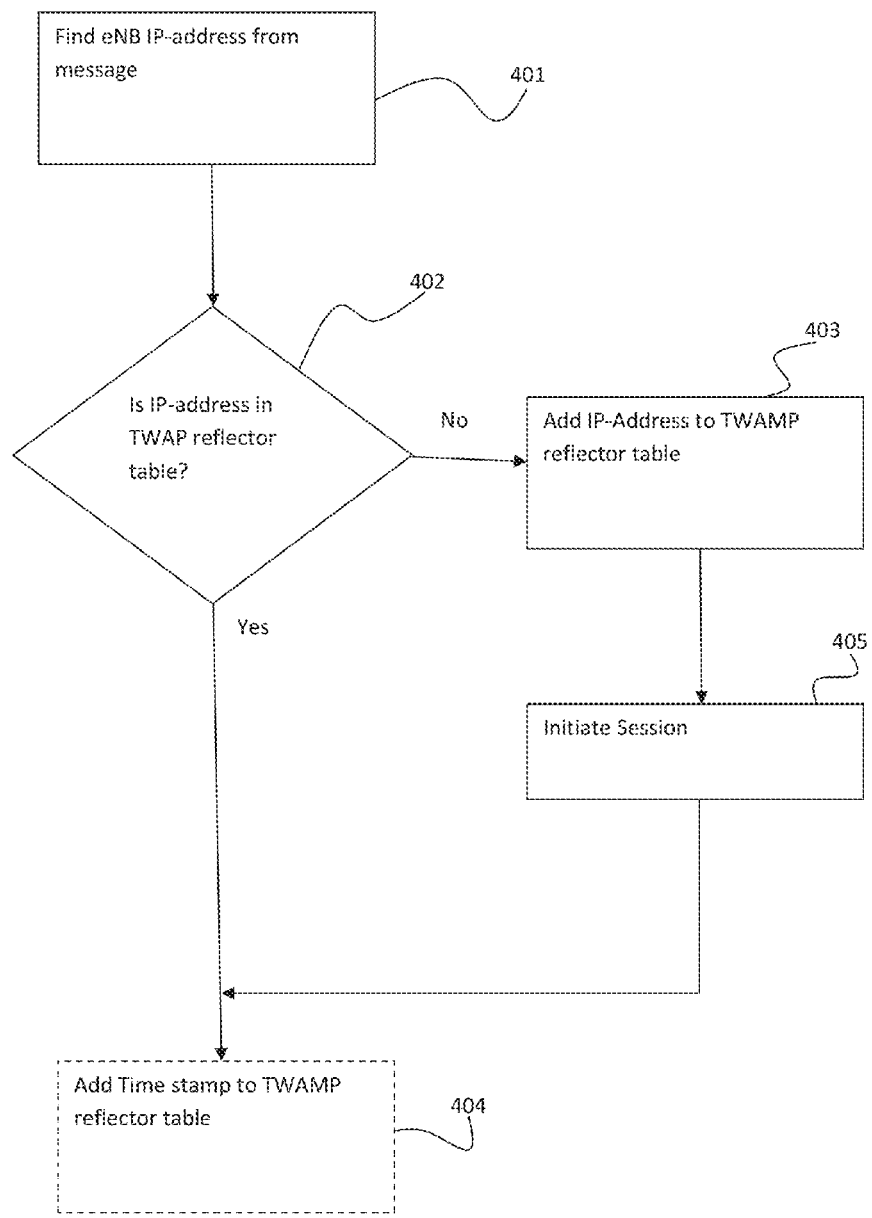

DYNAMIC PROVISIONING OF TWAMP

CROSS-REFERENCE TO RELATED APPLICATION

This application claims the benefit of U.S. Provisional Patent Application 61/763,098 filed Feb. 11, 2013.

TECHNICAL FIELD

The present invention generally relates to wireless communications system, and more particularly to self-organizing networks.

BACKGROUND

In 3GPP System Architecture Evolution, supporting the LTE radio access standard, several goals were defined, including several targets for more efficient data packet delivery. As a consequence Evolved Packet System (EPS), including E-UTRAN and Evolved Packet Core (EPC) introduced a new "flatter" architecture.

Eventually it was apparent that the E-Utran network would comprise a very large number of eNodeB and it was also evident that the large number of eNodeBs would quickly become unmanageable if configuration was not automatized. Indeed, there was an explicit target of "overall simplification" in the System Architecture Evolution (SAE). As a result, standardization supported Self-Organizing Networks (SON), enabling among other things auto-discovery of Mobility Management Entity (MME) when introducing a new eNodeB. As a consequence, introduction of an eNodeB requires zero, or very low, manual provisioning in EPC.

The Two-Way Active Measurement Protocol (TWAMP) is a performance measurement protocol standardized by IETF as RFC5357. The basic functionality comprises sending a IP packet from a sender to a reflector, the reflector returns the packet as quickly as possible to the sender, which may then deduce network characteristics for the network path traversed by the packet from the sender to the reflector and back. Such characteristics may for instance be used for measuring and maintaining Service Layer Agreements (SLA) in the network. Example of network characteristics may for instance be jitter, packet delay, hop count etc.

Due to a number of factors, including outsourcing of the mobile backhaul transport, many operators have been looking for new mechanisms for monitoring mobile backhaul performance characteristics. One mechanism that has rendered particular interest is the two-way active measurement protocol (TWAMP). Unfortunately the TWAMP protocol does not provide means for automatic provisioning.

SUMMARY

In exemplary embodiments in the present disclosure a method in a first Network Node for measuring network characteristics using a performance measuring protocol is defined. The method comprises receiving a message, extracting a network address of a second network node from said message, and storing said network address of said second network node. The method further comprises setting up a session for measuring network characteristics using said performance measuring protocol between said first network node and said second network node utilizing said network address.

In other exemplary embodiments a first Network Node adapted to measure network characteristics using a performance measuring protocol is disclosed. The first network node comprises a processor, a data storage and input/output adapted to receive a message and extract a network address of a second network node from said message, store said network address of said second network node and set up a session for measuring network characteristics using said performance measuring protocol between said first network node and said second network node utilizing said network address.

It should be noted that the first network node may comprise other hardware units necessary for the successful operation of the first network node as is common in the art. Further, some hardware units may be exchanged for other with identical or similar function. For instance, the processor may be an ASIC, FPGA or similar device as well as an off-the-shell computer processor.

In some embodiments the message is a Modify Bearer Request Message received from a Mobility Management Entity and the network address is an IP address of a Radio Base Station.

In some embodiments the message is an Uplink Data Packet received from a Radio Base Station and the network address is the IP address of the Radio Base Station.

In some embodiments the first network node is a Serving GateWay and the performance measuring protocol is the Two-Way Active Measurement Protocol. A TWMAP measurement packet is sent to the radio base station on a predetermined UDP port and a return packet is received from said radio base station. Further, information comprised in said return packet, as well as what can be deduced from reception such as time of reception, is used for determining network characteristics.

In some embodiments a control message is sent to the second network node initiating the session for the performance measuring protocol.

In some embodiments sending a control message comprises opening a TCP connection to the radio base station and at least one request-session message is sent to the radio base station.

In some embodiments it is determined if the extracted network address of the second network node is already stored and the network address of the second network node and setting up said session is only done if said extracted network address is not already stored.

In other embodiments a timestamp is stored in association with the extracted network address and the TCP connection is opened on a previously agreed port.

In other embodiments a UTP tunnel count is stored in association with the extracted network address. The UTP tunnel count is used to monitor if there is any active connections between the eNB and the SGW. If there is none the TWAMP session may be closed.

BRIEF DESCRIPTION OF DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIG. 4 is a schematic flow diagram according to some embodiments disclosed herein.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Figure 1:
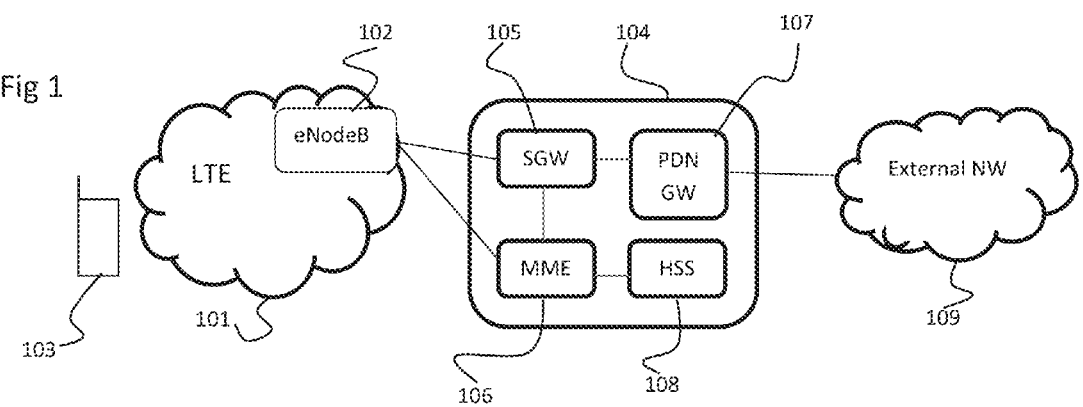
FIG. 1 is a schematic diagram of an LTE network implementing embodiments.

FIG. 1 illustrates a radio network 101 and one radio base station 102. It should be appreciated that the network 101 comprises multiple radio base stations but only one is shown in FIG. 1. In LTE radio base stations are commonly denoted eNodeB or eNB. In other types of radio networks, network nodes with similar functionality may be denoted differently, such as NodeB for 3G networks. The term radio base station is used as a collective term for a network node providing the general functionality to connect a wireless terminal, such as the User Equipment (UE) 103 illustrated in FIG. 1, through a wireless access 102 to a Evolved Packet Core (EPC) 104 for providing voice and data services. The term radio base station should thus not be construed narrowly. The evolved packet core (EPC) 104 comprises a Serving gateway (SGW) 105, a Mobility Management Entity (MME) 106, a PDN gateway 107 and a Home Subscriber Server (HSS) 108. The PDN gateway is further connected to external networks 109 providing connectivity for the UE 103 to external networks, such as the Internet.

As has been mentioned above FIG. 1 is merely a schematic illustration of a typical network disclosing only a limited set of nodes, and only one of each disclosed node. Although a typical network may include a large number of network nodes, for instance radio base stations; particularly in LTE the number of eNB is very large, there would also be a multitude of SGW, PDN GW, HSS and MME nodes. Other types of nodes would also be present.

According to exemplary embodiments further disclosed in detail below the SGW 105 is provided with a TWAMP Client, or a Session Sender and each Radio base Station 102 in the network 101 is provided with a TWAMP Server or a Session Reflector.

TWAMP Disclosure

Figure 2:
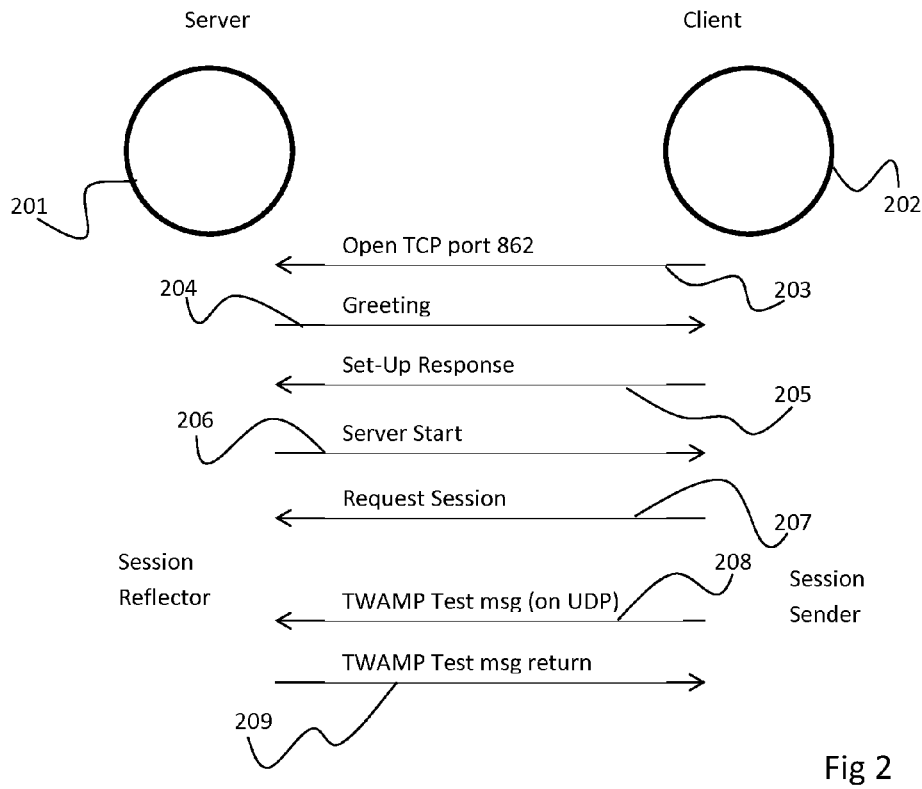
FIG. 2 is a schematic signal diagram illustrating connection between a TWAMP Client and Server.

FIG. 2 is a signal diagram for connection between a TWAMP server 201 and a TWAMP client 202. The server and client will be Session Reflector and Session Sender, respectively, during a following measurement session. The client 202 initiate a connection to the server 201 by opening a TCP connection 203 on a previously agreed port on which the server 201 is listening. According to the TWAMP IETF standard this is port 862. However the server can be configured to listen to any port, but the client then need to know which port the server is listening to, to be able to establish communication.

The server responds with a greeting message 204, the client then sends a set-up response 205 and the server responds with a server start message 206. The TWAMP client 202 and TWAMP server are now in communication and a measurement session can be initiated by the client through a request-session message 207. Please note that other messages can be exchanged between the server and client to provide further information or features. One particular such feature may be exchange of keys for establish secure, encrypted communication.

To be able to open the TCP connection 203, the client 202 needs to know both which port the server is listening to as well as the IP-address of the machine the server is residing on.

A straight forward introduction of TWAMP in a Self-Organizing Network (SON) would result in an unacceptable solution: A TWAMP connection would have to be manually provisioned between each SGW and each eNodeB that may become dynamically associated when a user connects. Such a situation would violate the rule of zero provisioning in EPC when introducing a new eNodeB, and the provisioning overhead would soon become unmanageable.

TWAMP does not provide a way for auto-discovery between Reflector and Sender. Moreover, even if there was one, there is no a priori association between an eNodeB and an SGW. The association is established dynamically when a user connects to the network, and a Packet Data Network (PDN)-Connection for that user is created. The MME dynamically selects SGW to serve the user. The selection is based on non-standardized criteria that may typically include load and geographic location of the eNodeB at which the user camps. Due, e.g., to user mobility, eNodeB as well SGW may change during the life-time of a PDN-Connection.

If the Session Reflector is initially set up to listen on an specific UDP port and provided to timestamp and return any packet arriving on that UDP port, the above disclosed connection process may be disposed of. The prerequisite is that the Session sender is aware of which UDP port to use. For most implementation this is of course not the case. However if it is known that the same vendor will deliver all of the eNodeB and SGW nodes a configuration like this may be possible. This is sometimes referred to as TWAMP light.

Figure 3:
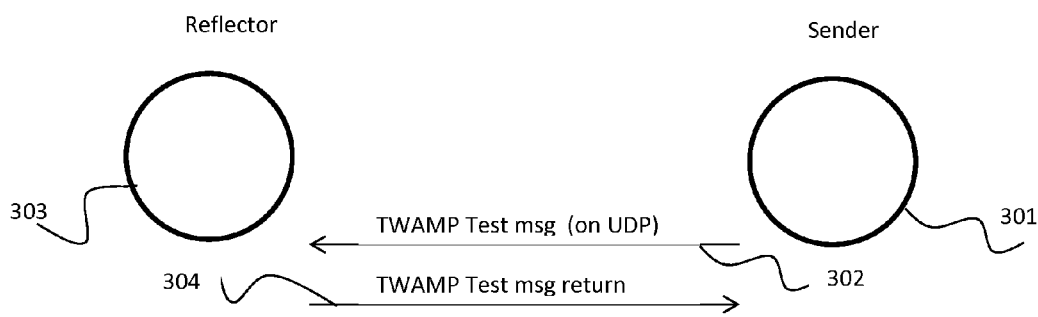
FIG. 3 is a schematic signal diagram illustrating sending TWAMP test messages between a sender and reflector.

The TWAMP light operation is illustrated in FIG. 3, where a Session Sender 301, residing in a SGW 105, sends a measurement packet 302, also known as a TWAMP test message to a Reflector 303, residing in a Radio Base Station 102. The reflector timestamp the packet and returns 304 it to the session sender 301.

Description of UE Attach

Figure 6:
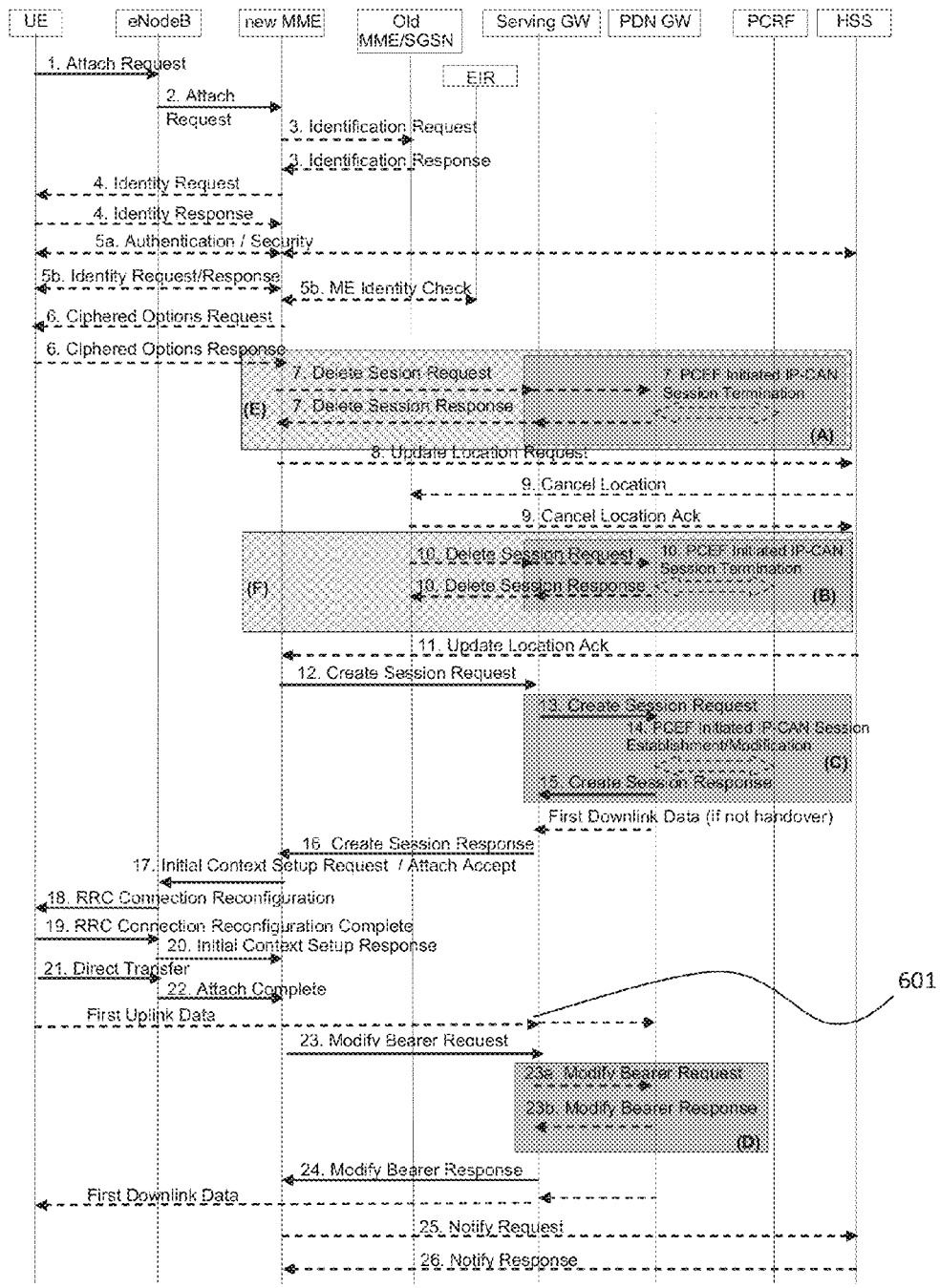
FIG. 6 is a schematic signaling diagram illustrating UE attach.

FIG. 6 is a signal diagram disclosing attach of a User Equipment to the network as disclosed in 3GPP TS 23.401

The process starts with a 1. Attach Request from the UE to the eNodeB. The Attached is completed with message 22. Attach Complete from the eNodeB 102 to the MME 106. After attach complete, data may be sent from the UE to the PDN GW 107. The 23. Modify Bearer Request is sent whenever the radio bearer should be updated, which in particular is the case when an attach is performed or when an area change is performed.

The 23. Modify Bearer Request comprises the IP-address of the eNodeB 102 receiving data from the UE 103 and connected to the SGW 105. According to the present disclosure the SGW 105 extracts the IP-address of the eNodeB from the 23. Modify Bearer Request and use that to set-up a TWAMP session as will be disclosed in further detail below.

In an alternative embodiment the SGW 105 extracts the IP address to the eNodeB from data packages 601 arriving from the eNodeB in question.

One way of deploying TWAMP, according to the present disclosure, is to implement a TWAMP Reflector in each eNodeB, and a TWAMP Sender in the Serving Gateway (SGW), hence enabling monitoring the user data path across the mobile backhaul.

According to embodiments in this disclosure the eNB IP-address information is recorded at the SGW for monitoring TWAMP between SGW and eNB, as will be disclosed in further detail below.

According to the present disclosure a TWAMP reflector is configured on each eNB and is listening to a configured port number known to SGW. For a standard TWAMP reflector the initial TWAMP control information is sent to port number 862.

The TWAMP monitoring information is checked when 1) a first attachment is performed and 2) during area change with changing S-GW 3) or without changing S-GW The eNB information may be checked and/or recorded at the SGW between the steps of "Modify Bearer Request" comes and "Modify Bearer Response" messages in FIG. 6.

The SGW will maintain a TWAMP-reflector table which will contain all the eNB that are connected to the SGW for TWAMP monitoring. When a "Modify bearer request" is received by the SGW, the SGW finds the eNB IP-address from this particular bearer service. The SGW TWAMP implementation will then check for the presence of the eNB in the TWAMP-reflector table. If the eNB is not present in the TWAMP-reflector table it is added and a TWAMP session is started through an internal configuration mechanism. If the TWAMP service is located on the same machine as the SGW this may be accomplished by a simple function call through an Application Protocol Interface (API) to the TWAMP Service.

Once a TWAMP session is started between the SGW and eNB, the session is not stopped until it is turned off from the SGW. This may be done manually or through configuration. For instance, if, during the TWAMP session monitoring the connection between the eNodeB and SGW it is discovered that the link is not performing according to specified criteria, the TWAMP session can be stopped and an alarm issued. Such detections may for instance include: No returned packages within a specific time window, the delay of returned packages is larger than a threshold, the jitter on the link is larger than a specific threshold etc. The SGW provides features to turn-off all eNB TWAMP sessions or each eNB sessions individually. For instance an operator can turn off all TWAMP session, reset the TWAMP-reflector address table and/or restart the TWAMP monitoring as disclosed herein.

TWAMP sessions are expected to run continuously at the default packet per second (PPS) rate. However, according to other embodiments this may be configurable.

According to one embodiment the reflector table comprises a Timestamp. This can for instance be used to note which eNB are being used recently. This information may be useful later for routing and load balancing. For instance, either automatically or by operator intervention a eNB that has not been used in a long time, as indicated by the time stamp, may be a candidate for moving connections or call-set up to.

According to a further embodiment the reflector table comprises a counter for each eNB indicating the active number of GTP tunnels. According to one embodiment this may be used for tearing down an active TWAMP session if the counter indicates the no GTP tunnels are active between the SGW and eNB in question. This could be done either immediately the counter reaches zero, or with a configurable time delay.

The counter can be increase and decreased when a Modify Bearer Request from the MME to the SGW indicates change of eNB for instance at a handover from a source eNB to a destination eNB. The counter would then be decreased for the source eNB and increased for the destination eNB.

According to one embodiment when the eNB IP-address is recorded in the TWAMP reflector table the Sender in SGW start sending TWAMP messages to the Reflector in eNodeB. This assumes that the Sender is pre-configured with a known light-reflector UDP port number which should be the same across all supported eNBs.

According to another embodiment the Sender in SGW uses the control procedure defined in IETF RFC 5357 "A Two Way Active Measurement Protocol" to establish a TWAMP connection with the Reflector in the eNodeBs. This involves sending control messages to a well-known port. The sender normally sends the initial TWAMP control request to port 862, however this particular port number may be changed. In that case, an a priori agreed upon non-standard port is used by Reflector and Sender.

In another embodiment the eNodeB dynamically selects a port, and conveys it to SGW via signaling over S1-C and S11.

FIG. 4 is a flow diagram performed in an SGW according to embodiments disclosed herein. An IP-address is obtained from a message received from a network node 401. According to different variants the message may be a Modify Bearer Request received from a Mobility Management Entity 106 or the message may be a data packet received from the eNodeB. The SGW checks 402 if the IP-address is already stored in the Reflector table. If the IP-address is not already in the TWAMP reflector table it is added 403 and in step 405 the IP-address is used to initiate a TWAMP session towards the eNodeB as has been disclosed above.

According to one embodiment a time stamp is added 404 to the Reflector table.

Figure 5:
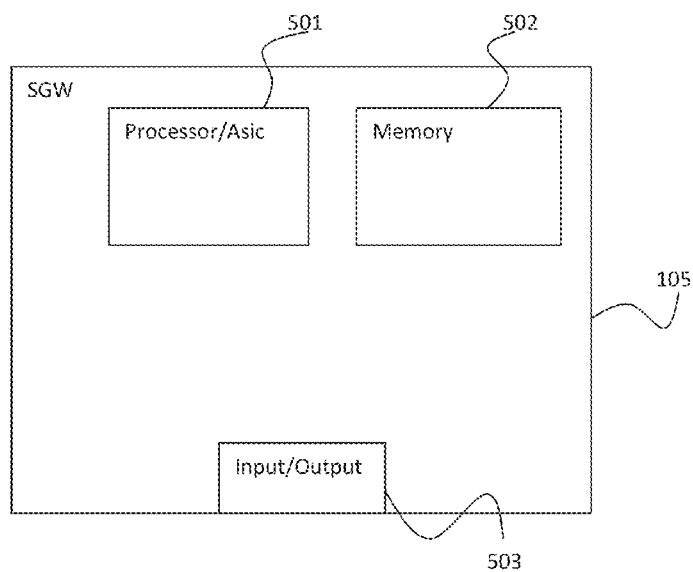
FIG. 5 is a schematic block diagram of a SGW according to the present disclosure.

FIG. 5 is a schematic block diagram of the SGW 105 implementing the embodiments disclosed herein. The SGW comprises a processor 501 or an ASIC for executing methods described, as well as memory 502 for storing instructions and data, for instance the TWAMP reflector table. Input/output means or a transceiver is provided for communication with different network entities, for instance MMEs as well as eNBs.

It should be noted that even though the present disclosure has primarily focused on the implementation between eNB and SGW, it is conceivable that the same procedure may be applied to monitor data connections between other network nodes, for instance between SGW and PGW or even between different eNBs.

With reference to FIG. 6, SGW receives the PGW's global, signaling IP-address in Message 12, Create Session Request, from the MME, which retrieves it via DNS based on selected APN, not shown in the signaling diagram. The PGW gets the SGW's Control Plane (CP) and User Plane (UP) IP-addresses in Message 13, Create Session Request, and SGW receives PGW's CP and UP IP-addresses in Message 15, Create Session Response. Hence PGW may act as TWAMP server in much the same sense as has been disclosed for the eNB and the SGW can request a TWAMP session using the PGW as TWAMP reflector to monitor the link them between in an automated fashion It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the present invention is limited only by the following claims and their legal equivalents.

What is claimed is:

1. A method in a Serving Gateway for monitoring mobile backhaul performance characteristics using a Two-Way Active Measurement Protocol (TWAP), the method comprising:
   receiving, by the Serving Gateway, a Modify Bearer Request Message;
   extracting, by the Serving Gateway, an Internet Protocol (IP) address of an eNodeB from said Modify Bearer Request Message;
   determining, by the Serving Gateway, whether the extracted IP address of said eNodeB is already stored in a TWAP-reflector table;
   based on the determination that the extracted IP address of said eNodeB is not already stored in the TWAP-reflector table, storing, by the Serving Gateway, said IP address of said eNodeB in said TWAP-reflector table; and,
   setting-up, by the Serving Gateway, a session utilizing said stored IP address and said Two-Way Active Measurement Protocol (TWAP) to monitor the mobile backhaul performance characteristics between said Serving Gateway and said eNodeB, wherein said Serving Gateway implements a TWAP Sender, and wherein said eNodeB implements a TWAP Reflector.

2. The method according to claim 1, further comprising:
   storing, by the Serving Gateway, a timestamp in association with said extracted IP address of said eNodeB in said TWAP-reflector table.

3. The method according to claim 1, further comprising,
   sending, by the Serving Gateway, TWAP messages to the TWAP Reflector in the eNodeB on a predetermined User Datagram Protocol (UDP) port,
   receiving, by the Serving Gateway, return TWAP messages from the TWAP Reflector in the eNodeB, and
   using information comprised in said return TWAP messages for determining the mobile backhaul performance characteristics.

4. A Serving Gateway configured to monitor mobile backhaul performance characteristics using a Two-Way Active Measurement Protocol (TWAP), the Serving Gateway comprising:
   a processor; and,
   a memory that stores processor-executable instructions, wherein the processor interfaces with the memory to execute the processor-executable instructions, whereby the Serving Gateway is operable to:
   receive a Modify Bearer Request Message;
   extract an Internet Protocol (IP) address of an eNodeB from said Modify Bearer Request Message;
   determine whether the extracted IP address of said eNodeB is already stored in a TWAP-reflector table;
   based on the determination that the extracted IP address of said eNodeB is not already stored in the TWAP-reflector table, store said IP address of said eNodeB; and,
   set-up a session utilizing said stored IP address and said Two-Way Active Measurement Protocol (TWAP) to monitor the mobile backhaul performance characteristics between said Serving Gateway and said eNodeB, wherein said Serving Gateway implements a TWAP Sender, and wherein said eNodeB implements a TWAP Reflector.

5. The Serving Gateway according to claim 4, wherein the Serving Gateway is further operable to:
   store a timestamp in association with said extracted IP address of said eNodeB in said TWAP-reflector table.

6. The Serving Gateway according to claim 4, wherein the Serving Gateway is further operable to:
   send TWAP messages to the TWAP Reflector in the eNodeB on a predetermined User Datagram Protocol (UDP) port,
   receive return TWAP messages from the TWAP Reflector in the eNodeB, and
   using information comprised in said return TWAP messages for determining the mobile backhaul performance characteristics.

* * * * *